June 20, 1972  C. B. ASKE, JR  3,671,076
VEHICLE WHEEL TRIM

Filed May 21, 1970  4 Sheets-Sheet 1

*INVENTOR.*
CHARLES B. ASKE, JR.
BY *Everett G. Wright*
ATTORNEY

INVENTOR.
CHARLES B. ASKE, JR.
BY Everett G. Wright
ATTORNEY

June 20, 1972  C. B. ASKE, JR  3,671,076
VEHICLE WHEEL TRIM
Filed May 21, 1970  4 Sheets-Sheet 3

INVENTOR.
CHARLES B. ASKE, JR.
BY
*Everett G. Wright*
ATTORNEY

June 20, 1972  C. B. ASKE, JR  3,671,076
VEHICLE WHEEL TRIM
Filed May 21, 1970  4 Sheets-Sheet 4
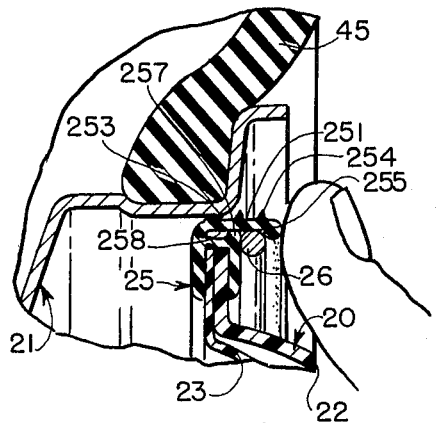
FIG. 14
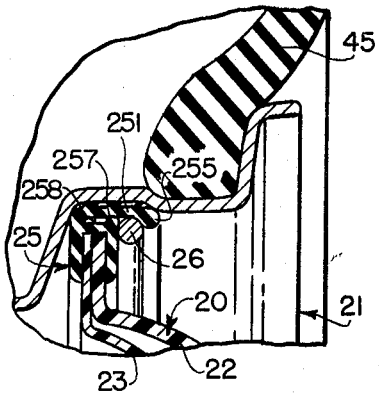
FIG. 15
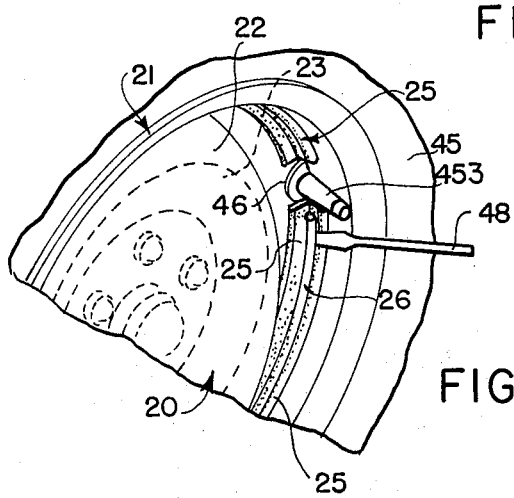
FIG. 16
FIG. 18
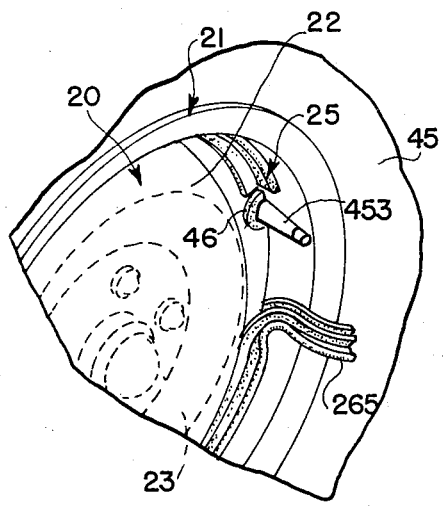
FIG. 17
INVENTOR.
CHARLES B. ASKE, JR.
BY Emett G. Wright
ATTORNEY

3,671,076
VEHICLE WHEEL TRIM
Charles B. Aske, Jr., 1278 Pilgrim,
Birmingham, Mich. 48009
Filed May 21, 1970, Ser. No. 39,260
Int. Cl. B60b 7/04
U.S. Cl. 301—37 R                2 Claims

ABSTRACT OF THE DISCLOSURE

Vehicle wheel trim for modern vehicle wheels in the form of a wheel trim assembly telescopically mounted within the tire bead seat annulus of vehicle wheels preferably comprising a clear, tinted, or colored transparent plastic outer bubble and an opaque ornamental plastic inner plastic disc preferably chrome plated, chrome plated and painted, or painted in whole or in part to produce a variety of highly desirable aesthetic effects. The outer plastic bubble and inner plastic ornamental disc are of the same diameter and terminate in mating peripheral flanges over which is telescopically disposed an improved, simplified and positive resilient anchorage means which substantially seals the peripheries of the wheel trim elements together and removably secures the ornamental wheel trim assembly on the vehicle wheel within the tire bead seat annulus thereof, the said anchorage means providing for relative thermal expansion and contraction differentials of the metal vehicle wheel rim and the plastic wheel trim elements. The anchorage means alternately may include a metal brightly finished spring expansion ring which is not only ornamental but also serves as an auxiliary anchorage element. Also, alternatively, a single ornamental wheel cover element may be substituted for the outer bubble and inner disc elements.

BACKGROUND OF THE INVENTION

The instant invention relates to multiple element plastic vehicle wheel trim of the type that substantially covers a modern vehicle wheel which provides unusual in-depth ornamentation thereof, and includes an improved means for easier and more positive mounting of the vehicle wheel trim within the tire bead seat annulus of a rim of the vehicle wheel which materially simplifies the removal of said wheel trim therefrom, all with less possibility of breakage or distortion of the plastic wheel trim elements. The said mounting means further includes provisions for permitting expansion and contraction of the plastic vehicle wheel trim elements within the tire bead seat annulus of the vehicle wheel rim.

The particular prior art known to the applicant relating to the subject matter of the instant invention is disclosed in U.S. Pat. No. 3,397,918 to Charles B. Aske, Jr., and Edward L. Wood, and U.S. Pat. No. 3,397,921 to Charles B. Aske, Jr.

BRIEF SUMMARY OF THE INVENTION

The instant invention relates to vehicle wheel trim comprising a generally dome shaped transparent plastic outer wheel cover element, either clear or of a selected color or tint, and an opaque plastic ornamental inner disc element preferably chrome plated and/or painted, said dome and disc shaped plastic elements being spaced except at their mating peripheral flanges notched to accommodate the tire valve stem normally extending from the drop center or tire bead seat annulus of the vehicle wheel within which the wheel trim is telescopingly mounted, and a resilient rubber anchorage means comprising a radially inwardly disposed channel portion telescoped over the outer periphery of said mating peripheral flanges of the wheel cover and ornamental disc elements of said vehicle wheel trim except at the said tire valve stem notch therein which preferably has an arcuate grommet telescoped thereover. The channel portion of the anchorage means has an anchorage flange extending diagonally axially outwardly from the inner side of the base thereof terminating in a continuous bulbous axially outer edge portion. The outer side of the base of the channel portion of the anchorage means is provided with a continuous bead therealong which, together with the said smooth side of the anchorage flange, forms a continuous air space between the said anchorage of the said anchorage means and the back of the said radially disposed channel thereof when said vehicle wheel trim is mounted within the inner periphery of the tire bead seat flange of a vehicle wheel. This continuous air space in the anchorage means is formed to prevent dirt and other foreign matter from accumulating therein, and, functions to permit the plastic vehicle wheel trim elements to expand and contract within said tire bead annulus of the vehicle wheel upon which the vehicle wheel trim is mounted, and to provide for ease in mounting and demounting the vehicle wheel trim on and from a vehicle wheel.

BRIEF DESCRIPTION OF THE DRAWINGS

Reference is now made to the drawings wherein like reference characteris refer to like and corresponding parts throughout the several views, in which:

FIG. 14 is a cross sectional view similar to FIG. 9 except the auxiliary spring retainer ring is shown positioned in place, and a thumb is shown applying pressure to telescope the vehicle wheel trim in mounted relationship on the vehicle wheel;

FIG. 15 is a cross sectional view similar to FIG. 14 except that the vehicle wheel trim is completely mounted on the vehicle wheel within the tire bead seat annulus thereof;

FIG. 16 is a fragmentary view in perspective showing the auxiliary spring retainer ring, if used, being pried by a screw driver off the vehicle wheel trim;

FIG. 17 is a fragmentary view in perspective showing the use of a screw driver to loosen one end of the resilient rubber anchorage means from between the wheel cover elements and the wheel trim; and FIG. 18 is a fragmentary view in perspective showing one end of the resilient rubber anchorage means loosened sufficiently from the peripheral flanges of the plastic wheel trim elements to be manually gripped and pulled from between the plastic wheel trim elements and wheel rim, thus readily completely dismounting the wheel trim of the invention from the vehicle wheel.

DESCRIPTION OF THE PREFERRED EMBODIMENTS

Figure 2:
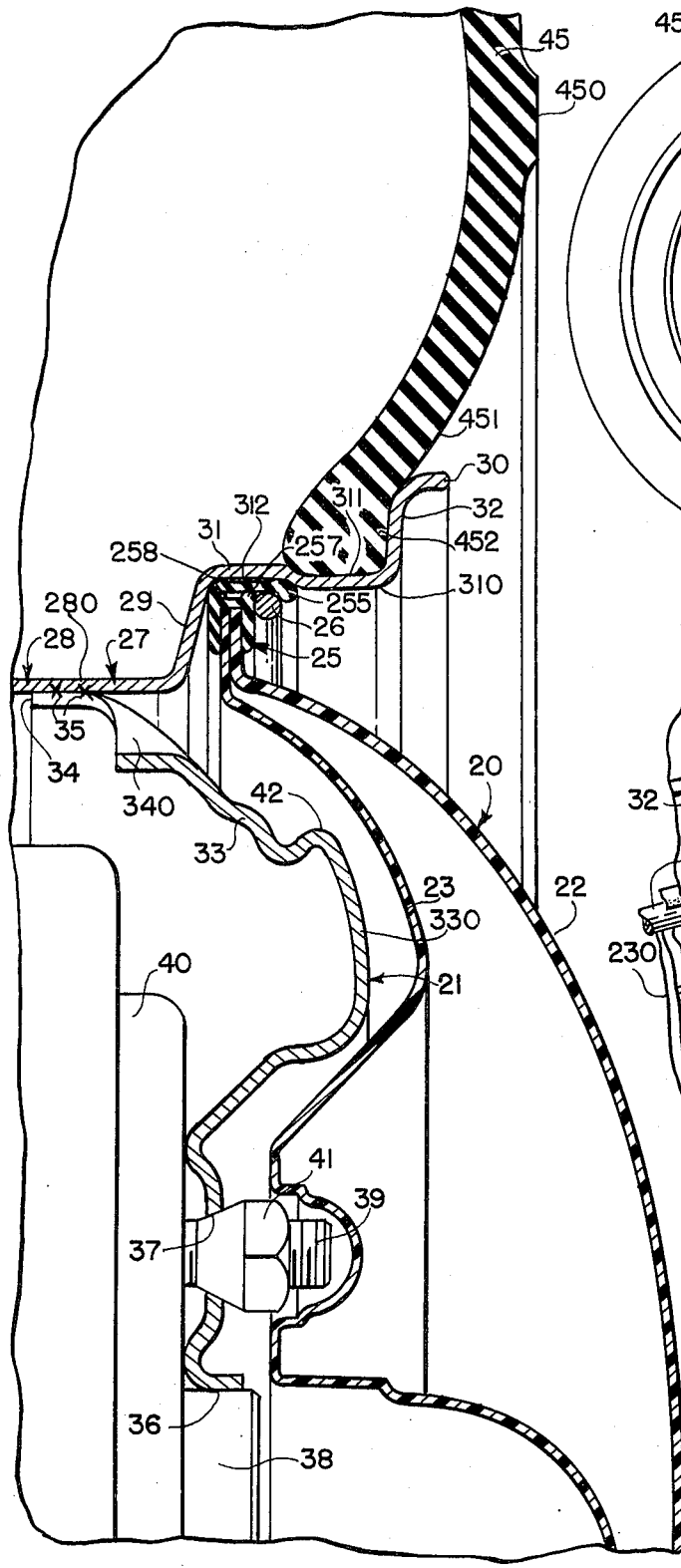
FIG. 2 is an enlarged fragmentary sectional view taken on the line 2—2 of FIG. 1.
Figure 1:
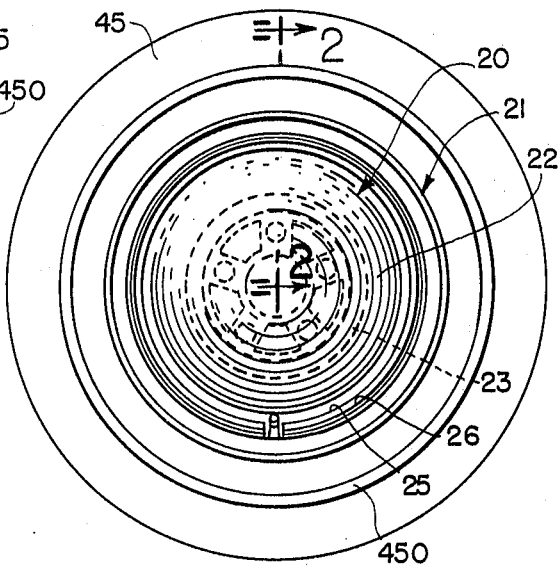
FIG. 1 is a side elevational view of a vehicle wheel having wheel trim in the form of a wheel cover of the invention mounted thereon.
Figure 3:
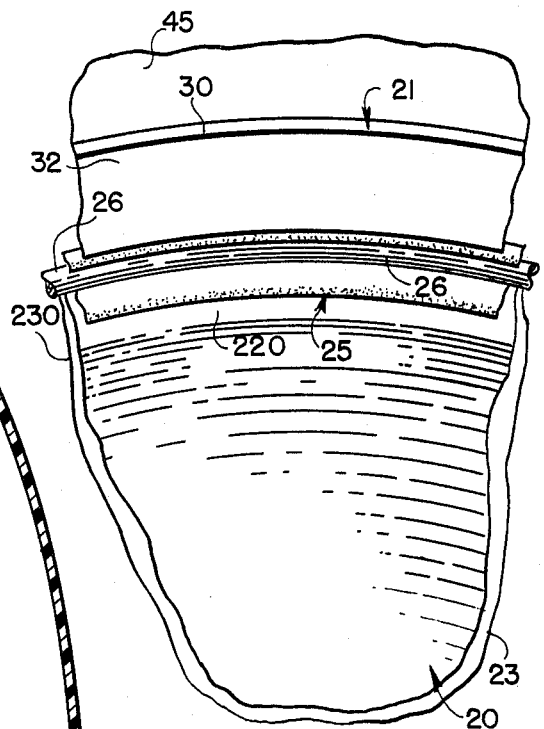
FIG. 3 is an enlarged fragmentary elevational view of the embodiment of vehicle wheel trim of the invention shown in FIGS. 1 and 2.
Figure 4:
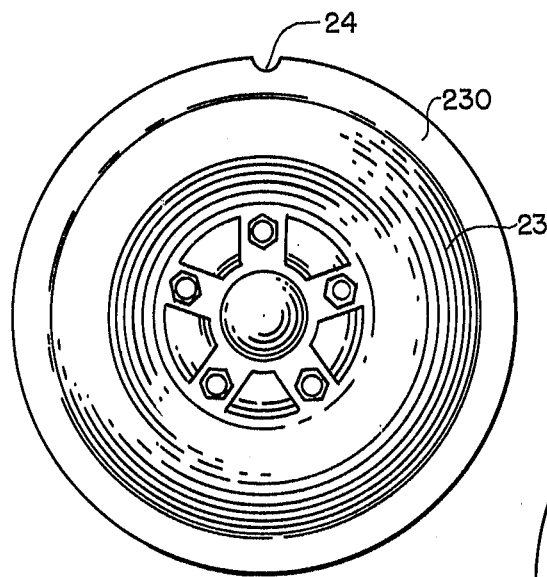
FIG. 4 is an elevational view of one form of a reflective ornamental disc element that may be employed.
Figure 5:
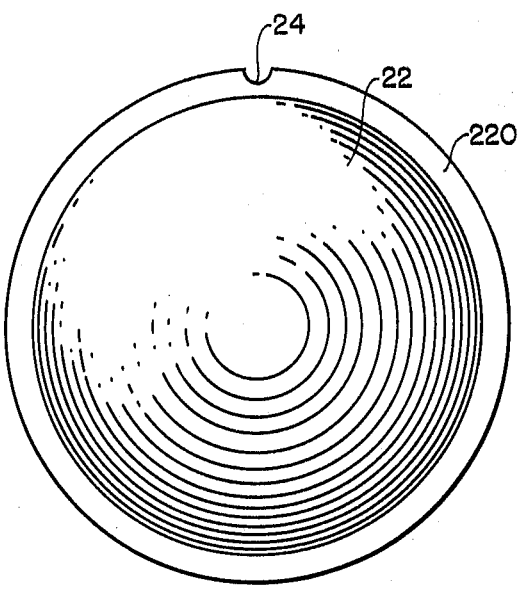
FIG. 5 is an elevational view of a dome shaped transparent plastic wheel cover element of a selected color or tint.

The particular vehicle wheel trim 20 of the invention shown in the drawings usable on modern type vehicle wheels 21 preferably consists of an axially outer transparent plastic dome shaped wheel cover element 22 either clear of a selected tint or color, an axially inner ouaque ornamental disc element 23 preferably having relatively high reflective qualities, and a resilient rubber anchorage means 25 with which an ornamental auxiliary spring retainer ring 26 may be optionally employed. Also, optionally, a single ornamental wheel cover element, not shown, may be substituted for the outer wheel cover element and the inner ornamental disc. The outer transparent dome shaped wheel cover element 22 and the inner opaque ornamental disc 23 each having a radially disposed circumferential anchorage flange 220 and 230 respectively therearound juxtaposed in mating relationship with the other thereby holding the central ornamental portion 2300 of the opaque inner ornamental disc 23 in spaced relationship with respect to the domed portion 2200 of the transparent outer dome shaped wheel cover element 22. The resilient anchorage means 25 hereinafter described in detail is telescoped over the juxtaposed circumferential anchorage flanges 220 and 230 of said axially outer dome shaped transparent wheel cover element 22 and the axially inner opaque ornamental disc 23.

The said juxtaposed mating circumferential flanges 220 and 230 of the wheel cover element 22 and the ornamental disc element 23 respectively have aligned mating arcuate notches 24 formed therein to avoid contact between the wheel trim elements 22 and 23 and the tire valve stem 453 which normally extends generally axially outwardly from the drop center 28 of the drop center wheel rim 27. A resilient rubber arcuate grommet 46 having an outer channel 460 formed therein is preferably telescoped over the aligned arcuate notches 24 of the mating flanges 220 and 230 respectively of the wheel cover element 22 and the ornamental disc element 23 to substantially seal the same together at said aligned notches 24 and to avoid any possibility of the valve stem 22 being chafed by any relative movement of the wheel trim 20 with respect thereto.

The modern vehicle wheel 21 with which the instant invention is used preferably as a drop center rim 27 composed of a central channel or drop center 28 having side walls 29 and a base 280. An annular tire bead seat 31 extends laterally outwardly from each of the side walls 29 of the drop center 28. Each said tire head seat 31 preferably has an annular radially outwardly facing continuous tire bead seat pocket 311 formed therein adjacent a tire bead seat flange 32 extending radially outwardly therefrom, the said tire bead seat flange 32 being axially outwardly curved at its upper portion to form an axially disposed outer lip 30. The tire bead seat flange 32 is ofttimes referred to as the wheel flange, the said outer lip 30 is ofttimes referred to as the lip of the wheel rim, and the radially inner exposed annular face of the tire bead seat 31 is generally referred to as the tire bead seat annulus 310. The formation of the said continuous tire bead seat pocket 311 in the tire bead seat annulus 310 provides an annular radially inwardly facing tire bead seat anchorage recess 312 to accommodate the improved resilient anchorage means 25 of the vehicle wheel trim 20 of the instant invention, as hereinafter described. The said resilient anchorage means 25 may be formed of live white, black or other colored rubber or other suitable resilient material such as neoprene or the like.

Within the drop center 28 of the drop center rim 23 is a wheel spider 33 having an axially disposed flange 34 which is secured to the base 280 of the drop center 28 of the drop center rim 27 by such means as welding at 35. The said wheel spider 33 is generally provided with a central hub aperture 36 with securing stud holes 37 spaced therearound to accommodate respectively the wheel hub 38 and wheel securing studs 39 extending from the brake drum 40 to which the wheel 21 is usually secured by means of wheel securing nuts 41.

The flange 34 of the wheel spider 33 is generally scalloped out and formed at 340 at intervals around the periphery thereof to provide brake drum ventilation and/or added structural strength to the vehicle wheel 21. The spider 33 is generally formed with an annular axially outwardly extending collar 330 which is preferably provided with a plurality of hub cap retainer nubs 42 over which a conventional hub cap (not shown) is usually mounted; however, in the instant invention, no hub cap need be employed.

The particular tire 45 illustrated in the drawings is a tubless tire having a scuff bead 450 extending from its side wall 451. The tire side wall 451 terminates in a suitable mounting bead 452 which seats in the annular tire bead seat pocket 311 formed in the tire bead seat 31 of the drop center wheel rim 27.

Figure 7:
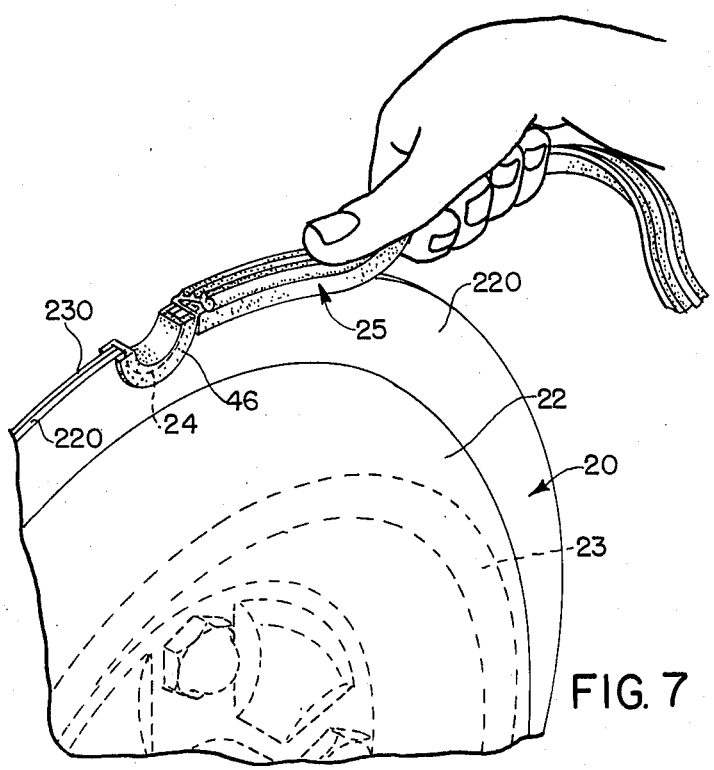
FIG. 7 is a fragmentary view in perspective showing the mated transparent dome shaped wheel cover element and opaqe ornamental disc having an arcuate grommet telescoped over the mating flanges thereof at a valve stem notch provided therein, and showing a preferred form of anchorage means being manually mounted in telescopic relationship over and onto the periphery of said mating flanges adjacent said grommet.
Figure 6:
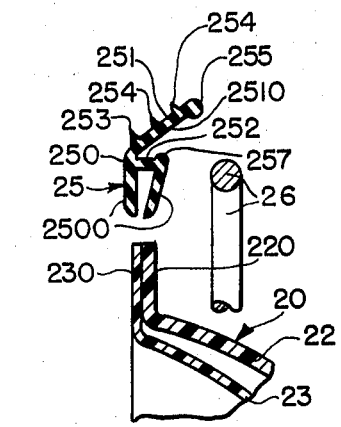
FIG. 6 is an exploded cross sectional view of the mated flanges of the dome shaped wheel cover element and opaque ornamental disc, the resilient rubber anchorage means, and an optional auxiliary spring retainer ring preferably employed.
Figure 8:
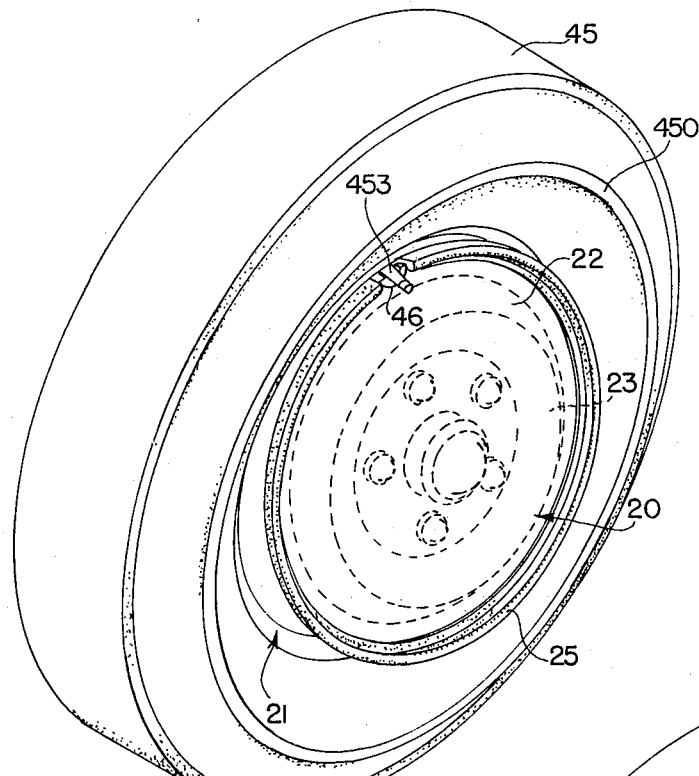
FIG. 8 is a view in perspective of a vehicle wheel with a wheel trim of the invention partially mounted thereon with the grommeted notch in the periphery thereof telescoped around the tire valve stem.
Figure 9:
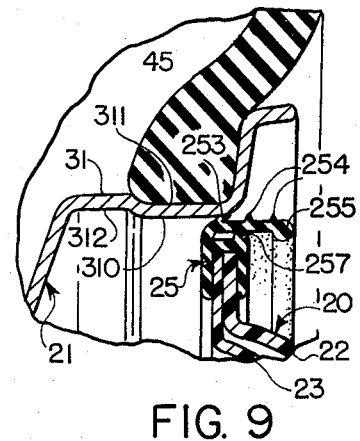
FIG. 9 is a fragmentary cross sectional view showing vehicle wheel trim of the invention telescoped partially on the vehicle wheel within the tire bead seat annulus thereof.

The resilient preferably rubber or neoprene anchorage means 25 employed to removably secure the wheel trim 20 of the invention on the vehicle wheel 21 comprises a radially inwardly disposed channel portion 250 including an integral resilient anchorage flange 251 extending diagonally axially outwardly from the axially inner corner and beyond the axially outer corner of the back 252 of the said channel portion 250, the said resilient anchorage flange 251 having a plurality of axially spaced longitudinally disposed relatively fine teeth 253 and 254 thereon and a bulbous continuous axially outer edge portion 255. Of the said continuous teeth 253 and 254, the axially innermost continuous tooth 253 is preferably somewhat longer than the other continuous teeth 254. The said channel portion 250 of the anchorage means 25 includes a pair of axially spaced radially inwardly disposed continuous flanges 2500 formed integral with the channel back 252 which are preferably molded with their free ends disposed toward each other as indicated in FIG. 6 so that the said channel portion 250 of the anchorage means 25 will firmly contact the mated anchorage flanges 220 and 230 of the wheel trim elements 22 and 23 as best shown in FIG. 9 when the said resilient anchorage means 25 is manually mounted on juxtaposed peripheral flanges 220 and 230 of said vehicle wheel trim elements 22 and 23 respectively as shown in FIG. 7. The axial outer corner of the back 252 of the channel portion 250 of the resilient rubber anchorage means 25 is provided with a continuous rib or bead 257 therealong which is contacted by the preferably smooth side 2510 of the said anchorage flange 251 thereof when vehicle wheel trim 20 of the invention is telescopingly mounted on a vehicle wheel 21 thereby forming a continuous air space 258 therealong preferably directly opposite the peripheral edges of the juxtaposed anchorage flanges 220 and 230 of the wheel cover element 22 and ornamental disc 23 respectively.

Vehicle wheel trim 20 of the invention consisting of a mating wheel cover element 22 and ornamental disc 23 is assembled by first juxtaposing the anchorage flanges 220 and 230 thereof with the notches 24 therein disposed in alignment. The arcuate grommet 46 is then telescoped over the juxtaposed flanges 220 and 230 in the notches 24 thereof. The resilient anchorage means 25 is then assembled on the periphery of the juxtaposed anchorage flanges 220 and 230 of the dome shaped wheel cover element 22 and ornamental disc 23 as shown in FIG. 7, the channel portion 250 of the said anchorage means 25 being telescoped to refusal over the outer periphery of the said juxtaposed anchorage flanges 220 and 230 of the dome shaped wheel cover element 22 and ornamental disc 23. The vehicle wheel trim 20 is now assembled ready for mounting on a vehicle wheel 21.

The tire bead seat annulus 310 and the adjacent side wall 29 of the drop center rim 27 of the vehicle wheel 21 are thoroughly washed clean prior to mounting the vehicle wheel trim 20 of the invention on said vehicle wheel. The tire bead seat annulus 310 of the drop center rim 27 is then thoroughly soaped preferably by wiping the same with a damp cloth which has been substantially soaped preferably by rubbing a bar of soap thereover. This leaves a deposit of damp soap on the tire bead seat annulus 310 of the drop center rim 27 of the vehicle wheel 21.

The wheel trim assembly 20 consisting of an outer dome shaped transparent plastic wheel cover element 21, an inner plastic ornamental disc element 23, a grommet 46, and a resilient anchorage means 25 is then engaged within the tire bead seat annulus 310 of the said drop center rim 27 of the vehicle wheel 21 by first placing the grommet 46 adjacent the tire valve stem 453 extending generally axially outwardly from the drop center wheel rim 27 as best shown in FIG. 7, and then telescoping the said wheel trim assembly evenly within the tire bead seat annulus 310 thereof as best shown in FIG. 9 by pressing the tire bead seat assembly axially inwardly at the resilient anchorage means 25 at intervals therearound until the tire bead assembly assumes the position shown in FIG. 2. With the tire bead seat annulus 310 of the wheel rim 27 properly cleaned and soaped, the wheel trim assembly 20 of the invention is easily and readily mounted on a vehicle wheel 21, and, even though the tire bead seat anchorage recess 312 of some drop center rims 27 are quite narrow, at least one or in most instances two of the anchorage teeth 253 and 254 on the back 252 of the resilient anchorage flange 251 of the channel portion 250 of the resilient anchorage means 25 will register within the tire bead seat anchorage recess 312 of the drop center rim 27, thus, assuring that the vehicle wheel trim 20 of the invention is positively mounted on even extremely narrow modern vehicle wheel rims.

Figures 10, 11:
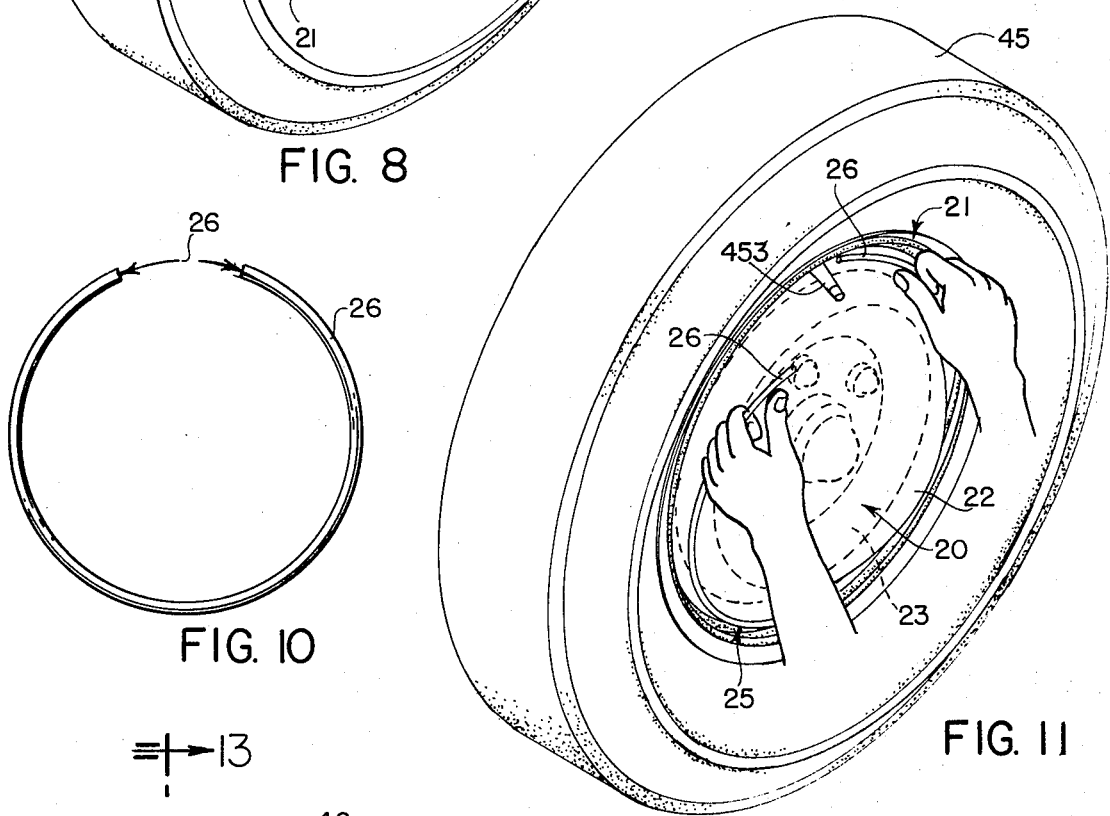
FIG. 10 is a side elevational view of an auxiliary spring retainer ring that may be employed in conjunction with the resilient rubber anchorage means.
FIG. 11 is a view in perspective showing vehicle wheel trim of the invention telescopically mounted on a vehicle wheel with the optional auxiliary spring retainer ring being mounted thereon.
Figure 12:
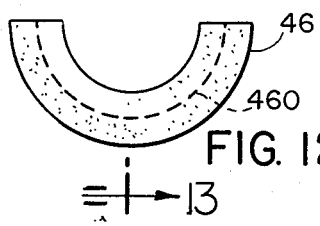
FIG. 12 is a side elevational view of the arcuate grommet preferably employed over the mated peripheral flanges of the said transparent wheel cover element and the opaque ornamental disc at the valve stem notch provided therein.
Figure 13:
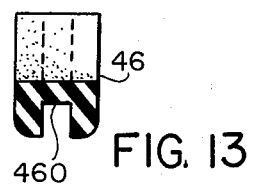
FIG. 13 is a cross sectional view taken on the line 13—13 of FIG. 12.

Vehicle wheel trim 20 of the invention without the use of an auxiliary anchorage means is positively secured on a modern vehicle wheel 21 as just described. However, if desired, auxiliary anchorage means 26 consisting of a brightly finished spring expansion ring may be employed which functions both as an auxiliary anchorage means for removably securing the vehicle wheel trim 20 within the tire bead seat annulus of the vehicle wheel 21, and, at the same time, will provide an additional annular ornamentation of the said vehicle wheel trim 20 adjacent the tire bead seat annulus 310 of the said vehicle wheel 21. FIG. 10 shows an auxiliary anchorage ring 26 which is formed circularly somewhat larger in diameter than the diameter of the tire bead seat annulus of the vehicle wheel with an open gap 260 therein. The said auxiliary anchorage ring 26 is sprung into place within the axially extending portion of the anchorage flange 251 of the resilient anchorage means 25 as best shown in FIG. 11 after the vehicle wheel trim assembly 20 is either partially mounted on a vehicle wheel as shown in FIG. 9 or fully mounted on a vehicle wheel as shown in FIG. 15. If sprung in place before the vehicle wheel trim 20 is completely mounted on the vehicle wheel, the said vehicle wheel trim is pushed axially in place by pushing it with one's thumb as shown in FIG. 14 at intervals therearound until the vehicle wheel trim assembly 20 has been pushed to refusal within the tire bead seat annulus of the vehicle wheel 21.

To remove the vehicle wheel trim 20 from the vehicle wheel 21, if an auxiliary anchorage means or ring 26 is used, it is readily removed by prying with a screw driver or the like 48 near one end thereof as shown in FIG. 16. As soon as the end being pried is sufficiently loosened, the said auxiliary anchorage means 26 may be readily removed manually. Then, the screw driver 48 is used to pry one end of the resilient anchorage means 25 free from the wheel cover and ornamental disc elements, whereupon the free end of the resilient anchorage means 25 may be manually pulled until the vehicle wheel trim 20 is completely removed from the vehicle wheel 21.

As hereinbefore pointed out, it is obvious that vehicle wheel trim of the invention may have the inner ornamental disc 23 omitted, in which event, the outer wheel cover element 22 would be of plastic or any other suitable material, formed to a bubble shape or to any other selected design, and be of any desired color or ornamentation.

Furthermore, although not shown in the drawings, it is contemplated that an adhesive means or any other suitable cementitious material may be applied within the legs 2500 of the channel portion 250 of the anchorage means 25 so that vehicle wheel trim may be permanently assembled before sale or use. In which event, the entire wheel trim assembly would be pried off the vehicle wheel rim with a screw driver as a unit after the ornamental auxiliary anchorage ring 26, if used, is first removed therefrom.

Although but a single embodiment of the invention and several modifications thereof have been disclosed and described in detail, it is obvious that many changes may be made in the size, shape, arrangement and detail of the various elements of the invention without departing from the spirit and scope thereof as defined by the appended claims.

I claim:

1. Vehicle wheel trim for vehicle wheels of the type including a wheel spider and a drop center rim having an axially outwardly extending tire bead seat forming an axially extending tire bead seat annulus with an axially inner annular anchorage recess formed therein adjacent to and terminating at the outer side wall of the drop center of said drop center rim, said vehicle wheel trim comprising a generally dome shaped transparent plastic wheel cover element of a selected color including a radially outwardly disposed circumferential anchorage flange, a reflective ornamental disc element having an opaque ornamental central portion spaced axially inwardly from the dome of the said wheel cover element and including a radially outwardly disposed circumferential anchorage flange juxtaposed and mating with the circumferential anchorage flange of said dome shaped transparent wheel cover element, said mating circumferential anchorage flanges of said dome shaped wheel cover element and said ornamental disc having an arcuate valve stem notch therein whereby to avoid contact with the tire valve stem normally extending from the vehicle wheel, an arcuate channel type grommet telescoped over the peripheral edges of said mating flanges at the said valve stem notch therein, an annular resilient rubber anchorage means comprising a radially inwardly disposed channel having a base and a pair of spaced flanges telescoped over the mating flanges of said dome shaped wheel cover element and said ornamental disc, except at said grommet, with the base of said channel disposed over the peripheral edges of said mating flanges, said resilient rubber anchorage means including an anchorage flange extending diagonally axially outwardly from the axially inner corner and beyond the axially outer corner of the back of said channel base having a plurality of axially spaced relatively fine circumferential teeth thereon and a bulbous axially outer edge portion, the axially outer corner of the back of said channel base having a continuous rib therealong forming a continuous trough along the back of said channel base, said continuous rib contacting said anchorage flange when the vehicle wheel trim is mounted on a vehicle wheel within the tire bead seat annulus whereby to provide a continuous air space between the anchorage flange of said resilient rubber anchorage means and the back of the radially disposed channel thereof, the assembly of said wheel cover element, said ornamental disc, the grommet and said anchorage means being axially telescopingly mounted on said vehicle wheel within the tire bead seat annulus of the drop center rim thereof with a portion of said anchorage means disposed axially against the drop center of the said drop center rim.

2. Vehicle wheel trim as claimed in claim 1 wherein adhesive means is employed in the channel of said resilient rubber anchorage means to fix the said resilient rubber anchorage means on the juxtaposed peripheral mating flanges of said dome shaped wheel cover element and said ornamental wheel disc.

References Cited
UNITED STATES PATENTS 2,812,215   11/1957   Waite _____ 301—37 P
3,397,918   8/1968    Aske _____ 301—37 P RICHARD J. JOHNSON, Primary Examiner